United States Patent
Zoldi et al.

(10) Patent No.: US 12,489,646 B2
(45) Date of Patent: Dec. 2, 2025

(54) BLOCKCHAIN-BASED MODEL GOVERNANCE AND AUDITABLE MONITORING OF MACHINE LEARNING MODELS

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 336 days.

(21) Appl. No.: 18/164,483

(22) Filed: Feb. 3, 2023

(65) Prior Publication Data
US 2024/0267239 A1    Aug. 8, 2024

(51) Int. Cl.
*H04L 9/00* (2022.01)
*G06N 3/045* (2023.01)
*G06N 3/08* (2023.01)

(52) U.S. Cl.
CPC .............. *H04L 9/50* (2022.05); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 10,599,984 B1 * | 3/2020 | Wubbels | G16H 50/20 |
| 10,979,461 B1 | 4/2021 | Cervantez et al. | |
| 11,157,629 B2 | 10/2021 | Shenoy et al. | |
| 11,977,836 B1 * | 5/2024 | Archambeau | G06F 40/279 |
| 2020/0082302 A1 * | 3/2020 | Zoldi | G06N 20/00 |
| 2021/0334695 A1 | 10/2021 | Raj et al. | |
| 2022/0166782 A1 * | 5/2022 | Zoldi | G06N 3/045 |
| 2022/0308895 A1 * | 9/2022 | Ben-Elazar | G06N 3/045 |

FOREIGN PATENT DOCUMENTS

CN   114448777 A   5/2022

* cited by examiner

*Primary Examiner* — Scott B Christensen

(57) ABSTRACT

A method includes determining, by a trained machine learning model, a score based at least on one or more latent features. The method also includes monitoring the determining of the score by the trained machine learning model. The monitoring includes determining one or more production statistics associated with the one or more latent features, derived variables and input data elements, and accessing one or more reference assets persisted on a model governance blockchain. The one or more reference assets includes one or more reference statistics and a threshold indicating a deviation between the one or more production statistics and the one or more reference statistics. The method also includes generating an alert based on the one or more production statistics associated with the one or more latent features meeting the threshold. Related methods and articles of manufacture are also disclosed.

20 Claims, 11 Drawing Sheets

1000

DETERMINING A SCORE BASED AT LEAST ON ONE OR MORE LATENT FEATURES
1002

MONITORING DETERMINING OF THE SCORE BY AT LEAST ACCESSING ONE OR MORE REFERENCE ASSETS PERSISTED ON A MODEL GOVERNANCE BLOCKCHAIN
1004

GENERATING AN ALERT BASED ON ONE OR MORE DEPLOYMENT STATISTICS MEETING A THRESHOLD INCLUDED IN THE ONE OR MORE REFERENCE ASSETS
1006

500

| Input data | Derived variables |
|---|---|
| #1 ✓ | f2, f4 |
| #2 | |
| #3 ✓ | f1, f2 |
| #4 ✓ | f3 |
| #5 ✓ | |
| ... | ... |

```
reference_assets: {
    input: {
        "#1": {
            mean: 2.7,
            alert: {
                {thresh1: 2.8, comp: ">", N: 1000}
            },
            stdev: 1.1,
            alert: {
                {thresh1: 1.3, comp: ">", N: 1000}
            }
        },
        "#3": {
            mean: 6.9,
            stdev: 2.3,
            alert: {
                {stats: "div", thresh1: 0.2, comp: ">=", N: 10000}
            }
        }
    }
}
```

```
reference_assets: {
    latentfeatures: {
        firing_threshold: 0.85,
        LF1: {
            freq: 10%,
            alert: {
                {thresh1: 8%, comp: "<", N: 100000}
            }
        }
        (1,0,1,0,0,0,1,0,0,0): {
            freq: 0.001%,
            alert: {
                {thresh1: 0.0005%, comp: "<", duration: "1 day"}
                {thresh1: 0.002%, comp: ">", duration: "1 day"}
            }
        }
    }
}
```

```
reference_assets: {
    coverage: {
        ["input1", "input2"]: {
            ["0.0-1.0", "-2.0, 1.1"]: {
                freq: 6%,
                alert: {
                    {thresh1: 4%, comp: "<", N: 1000}
                    {thresh1: 8%, comp: ">", N: 1000}
                }
            }
            ["1.0-3.0", "1.1, 3.2"]: {
                freq: 0%,
                alert: {
                    {thresh1: 0%, comp: ">=", N: 1}
                }
            }
        }
    }
}
```

DETERMINING A SCORE BASED AT LEAST ON ONE OR MORE LATENT FEATURES
1002

MONITORING DETERMINING OF THE SCORE BY AT LEAST ACCESSING ONE OR MORE REFERENCE ASSETS PERSISTED ON A MODEL GOVERNANCE BLOCKCHAIN
1004

GENERATING AN ALERT BASED ON ONE OR MORE DEPLOYMENT STATISTICS MEETING A THRESHOLD INCLUDED IN THE ONE OR MORE REFERENCE ASSETS
1006

BLOCKCHAIN-BASED MODEL GOVERNANCE AND AUDITABLE MONITORING OF MACHINE LEARNING MODELS

FIELD

The present disclosure generally relates to machine learning models and more specifically to blockchain-based model governance and auditable monitoring of machine learning models.

BACKGROUND

Machine learning models are increasingly used for automating decisions. However, without use of a strong model development standards and governance of adherence to such standards, machine learning models can harm individuals and society. Generally, model development and responsible machine learning standards defined by an organization ensure that the model requirements, training data, performance objectives, explainability, bias testing, stability testing, and robustness testing are all responsibly and ethically performed. Following these standards helps to prove that the model development processes are followed, and moreover it specifies all the necessary production responsible AI model monitoring requirements as part of the auditable model development process for informing model monitoring alerts for when the model is deployed.

SUMMARY

Methods, systems, and articles of manufacture, including computer program products, are provided for segmentation using zero value features in machine learning. In one aspect, there is provided a system. The system may include at least one processor and at least one memory. The at least one memory may store instructions that result in operations when executed by the at least one processor. The operations may include: determining, by a trained machine learning model, a score. The trained machine learning model determines the score based at least on one or more latent features. The operations also include monitoring the determining of the score by the trained machine learning model. The monitoring includes: determining one or more production statistics associated with the one or more latent features. The monitoring also includes accessing one or more reference assets persisted on a model governance blockchain. The one or more reference assets were persisted during training of the trained machine learning model. The one or more reference assets include: one or more reference statistics associated with the one or more latent features and a threshold indicating a deviation between the one or more production statistics and the one or more reference statistics. The operations also include generating an alert based on the one or more production statistics associated with the one or more latent features meeting the threshold.

In another aspect, a method includes determining, by a trained machine learning model, a score. The trained machine learning model determines the score based at least on one or more latent features. The method also includes monitoring the determining of the score by the trained machine learning model. The monitoring includes: determining one or more production statistics associated with the one or more latent features. The monitoring also includes accessing one or more reference assets persisted on a model governance blockchain. The one or more reference assets were persisted during training of the trained machine learning model. The one or more reference assets include: one or more reference statistics associated with the one or more latent features and a threshold indicating a deviation between the one or more production statistics and the one or more reference statistics. The method also includes generating an alert based on the one or more production statistics associated with the one or more latent features meeting the threshold.

In another aspect, there is provided a computer program product including a non-transitory computer readable medium storing instructions. The instructions may cause operations may executed by at least one data processor. The operations may include: determining, by a trained machine learning model, a score. The trained machine learning model determines the score based at least on one or more latent features. The operations also include monitoring the determining of the score by the trained machine learning model. The monitoring includes: determining one or more production statistics associated with the one or more latent features. The monitoring also includes accessing one or more reference assets persisted on a model governance blockchain. The one or more reference assets were persisted during training of the trained machine learning model. The one or more reference assets include: one or more reference statistics associated with the one or more latent features and a threshold indicating a deviation between the one or more production statistics and the one or more reference statistics. The operations also include generating an alert based on the one or more production statistics associated with the one or more latent features meeting the threshold.

In some variations, one or more features disclosed herein including the following features can optionally be included in any feasible combination of the system, method, and/or non-transitory computer readable medium.

In some variations, the one or more production statistics includes at least one of a production mean, a production standard deviation, a production frequency of activation, and a probability distribution of the one or more latent features. The one or more reference statistics includes at least one of a reference mean, a reference standard deviation, a reference frequency of activation, and a probability distribution of the one or more latent features during training of the trained machine learning model.

In some variations, the trained machine learning model further determines the score based on one or more derived variables. The derived variables may be computed directly based on one or more input elements. The one or more reference assets persisted on the model governance blockchain includes a derived feature threshold indicating a tolerance for deviation from one or more reference statistics associated with the one or more derived variables. The alert is further generated based on one or more production statistics associated with the one or more derived variables meeting the derived feature threshold.

In some variations, the trained machine learning model further determines the score based on the one or more input elements. The one or more reference assets persisted on the model governance blockchain includes a data element threshold indicating a tolerance for deviation from one or more reference statistics associated with the one or more input elements. The alert is further generated based on one or more production statistics associated with the one or more input elements meeting the data element threshold In some variations, the method and/or operations includes performing one or more corrective operations based on the alert. The one or more corrective operations includes: generating the score based on a second machine learning model different from the trained machine learning model, ignoring the score generated by the trained machine learning model, and/or leveraging the score selectively in alternate strategies and decisioning logic.

In some variations, the one or more corrective operations are generated based on a severity level indicated by the alert. The severity level is determined based on a magnitude of the deviation between the one or more production statistics associated with the one or more latent features and the one or more reference statistics associated with the one or more latent features.

In some variations, the method and/or operations includes comparing the one or more production statistics associated with the one or more latent features to the one or more reference statistics associated with the one or more latent features to determine a magnitude of deviation between the one or more production statistics associated with the one or more latent features including tuple firing and the one or more reference statistics associated with the one or more latent features including tuple firing. The one or more reference assets persisted on the model governance blockchain includes another threshold indicating a tolerance for the magnitude of deviation from one or more reference statistics associated with the one or more latent features. The alert is further generated based on one or more production statistics associated with the one or more latent features meeting the other threshold.

In some variations, the one or more reference assets further includes: a reference coverage persisted on the model governance blockchain determined during training of the trained machine learning model. The reference coverage represents a distribution of the one or more latent features, the one or more derived variables, and/or the one or more input elements during the training of the trained machine learning model; and a threshold corresponding to the reference coverage In some variations, the monitoring further includes: determining a production coverage indicating a distribution of the one or more latent features, the one or more derived variables, and/or the one or more input elements based on determining the score. The monitoring further includes comparing the production coverage to the reference coverage persisted on the model governance blockchain. The monitoring further includes generating the alert based on the production coverage meeting the threshold corresponding to the reference coverage.

In some variations, the method and/or operations includes determining the one or more latent features and the one or more reference assets during training of the trained machine learning model. The method and/or operations further includes persisting the one or more latent features and the one or more reference assets on the model governance blockchain.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to blockchain-based model governance and auditable monitoring of machine learning models, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts an example mapping between input data and derived variables, consistent with implementations of the current subject matter;

FIG. 6 depicts a schematic representation of reference assets, consistent with implementations of the current subject matter;

FIG. 8 depicts a schematic representation of reference assets, consistent with implementations of the current subject matter;

FIG. 9 depicts a schematic representation of reference assets, consistent with implementations of the current subject matter;

FIG. 10 depicts a flowchart illustrating an example of a process for blockchain-based model governance and auditable monitoring of machine learning models, consistent with implementations of the current subject matter;

Figure 1:
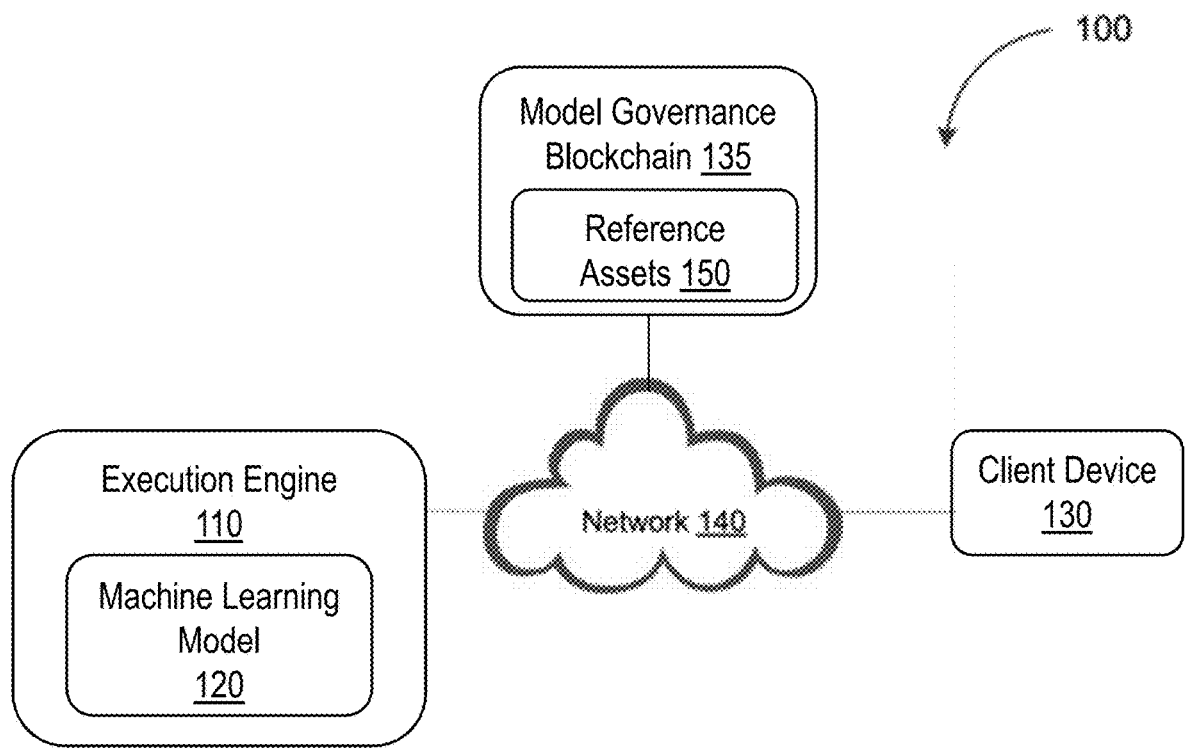
FIG. 1 depicts an example model governance system, consistent with implementations of the current subject matter.

When practical, like labels are used to refer to same or similar items in the drawings.

DETAILED DESCRIPTION

Adherence to responsible artificial intelligence (AI) standards beyond model development and in the usage of machine learning models in a production environment is critical to practicing responsible AI and can be an important piece of auditable AI. Generally, monitoring machine learning model in deployment or production environments is often an afterthought. For example, conventional methods may attempt to monitor shifts in data distributions or key variables, or performance of the models over time. However, such conventional methods merely determine lagging indicators of model issues. Thus, such conventional methods poorly monitor AI in the production environment.

The model governance system described herein allows for the monitoring of specific latent features and their distributions as part of a model development governance blockchain, as the model output is driven by the latent features and the combinations of firing of these which are complex functions of the data distributions and features. Rather than analyzing only shifts in data distributions, which can be irrelevant to how the latent features of machine learning models activate, to corresponding model score output, and to the efficacy of the machine learning models, the model governance system described herein may not only monitor data drift or variable values, but also monitors activation of latent features, which are the key drivers of the output scores, decisions, and actions generated during production use of such machine learning models.

Consistent with implementations of the current subject matter, the model governance system described herein monitors for responsible use of machine learning models by, for example, referencing the model development governance standard specifications persisted on model governance blockchain, where specific quantities to be monitored are specified, along with the distributions monitored for permitted use of the machine learning models. This provides an ability to determine, in the production environment, when the machine learning models are used in an unintended fashion based on deviations from the reference assets persisted to the blockchain.

Generally, the deployment and production usage of machine learning models is often disconnected from model development. Accordingly, conventional methods do not prescribe assigning model monitoring alerts or thresholds as part of the model development governance standard as to what features to monitor and/or may be biased towards not taking any action based on a lack of insight into the model development. Consistent with implementations of the current subject matter, reference assets and alerting logic (e.g., alerts) assets are persisted to a model governance blockchain during model development for reference during model production (e.g., deployment). This helps to remove ambiguity in the model operator's responsibility in monitoring and help to show responsible use of the AI.

Additionally, the model governance system consistent with implementations of the current subject matter persists records of all statistics and thresholds determined during design and development of machine learning models. This persistence is within an immutable audit trail on the blockchain (e.g., the model governance blockchain) for demonstration of adherence to responsible AI standards and enabling responsible AI model audits. Information persisted includes, for example, requirements related to the training and input data, model requirements, success criteria, performance criteria, variables utilized, ethics testing, robustness testing, out of time testing, explainability, thresholds, and/or the like. Decision assets (e.g., reference assets) persisted include machine learning models, and variables and execution code used in the machine learning models, as well as analytic computations and statistical alerting thresholds of what needs to be monitored to ensure ethical and safe use of the models and thresholds, when exceeded indicates that the model needs to be investigated in production. The blockchain ensures compliance and accountability with the internal and regulatory standards for model development and validation functions as the record of work, validation, approvals are persisted as proof-of-adherence. It further ensures that the critical knowledge associated with a decision asset's design and development is preserved for future reference.

As described herein, the model governance system monitors a machine learning model in a production environment. The system accesses one or more reference assets persisted to a model governance blockchain during training and/or development of the machine learning model. The one or more reference assets may include one or more latent features, derived variables, and/or input elements, such as those that impact determination of the score by the machine learning model. The one or more reference assets may also include one or more reference statistics, such as a mean, standard deviation, threshold, and/or the like corresponding to the one or more latent features, derived variables, and/or input elements derived during development of the machine learning model. Based on one or more production statistics determined during production usage of the machine learning model breaching the threshold included in the reference assets persisted to the blockchain, the system described herein may generate one or more alerts, and/or may perform one or more operations based on the alert, such as based on a severity of the alert. Accordingly, the model governance system described herein allows for monitoring, auditing, and/or adjusting one or more machine learning models in an immutable manner.

FIG. 1 depicts a system diagram illustrating an example of a model governance system 100, consistent with implementations of the current subject matter. Referring to FIG. 1, the model governance system 100 may include an execution engine 110, a model governance blockchain 135, and a client device 130. The execution engine 110, the model governance blockchain 135, and the client device 130 may be communicatively coupled via a network 140 and/or be directly coupled. The network 140 may be a wired network and/or a wireless network including, for example, a wide area network (WAN), a local area network (LAN), a virtual local area network (VLAN), a public land mobile network (PLMN), the Internet, and/or the like. In some implementations, the execution engine 110, the model governance blockchain 135, and/or the client device 130 may be contained within and/or operate on a same device. It should be appreciated that the client device 130 may be a processor-based device including, for example, a smartphone, a tablet computer, a wearable apparatus, a virtual assistant, an Internet-of-Things (IoT) appliance, and/or the like.

The execution engine 110 includes at least one data processor and at least one memory storing instructions, which when executed by the at least one data processor, perform one or more operations as described herein. The execution engine 110 may include a machine learning model 120. In some implementation, the machine learning model 120 may be deployed at and/or by the execution engine 110. For example, the execution engine 110 executes the machine learning model 120 to generate a score based on input data, monitor the machine learning model 120, and/or perform one or more operations based on the production usage of the machine learning model 120.

Referring to FIG. 1, the model governance blockchain 135 stores one or more reference assets 150. The model governance blockchain 135, such as a structure of the model governance blockchain 135 is described in more detail herein (see FIGS. 11A-11C).

Figure 2:
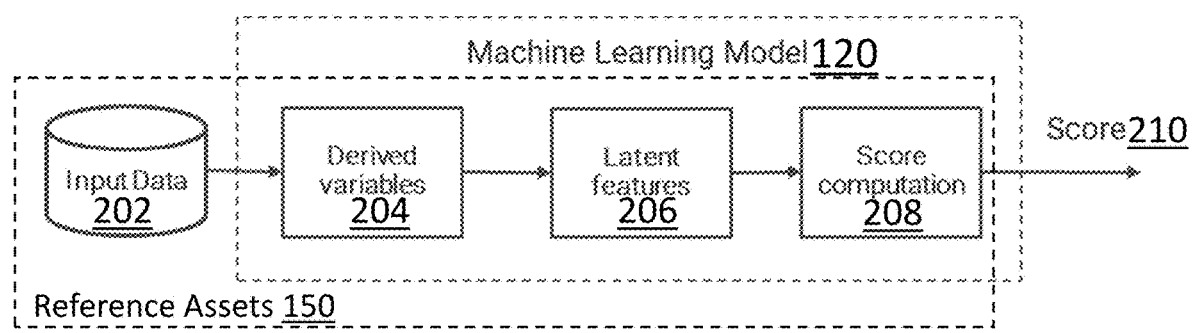
FIG. 2 depicts a schematic representation of a machine learning model, consistent with implementations of the current subject matter.

The machine learning model 120 may include one or more machine learning models, such as a neural network, a supervised machine learning model, an unsupervised machine learning model, and/or the like. FIG. 2 illustrates a schematic representation of the machine learning model 120. Referring to FIG. 2, the machine learning model 120 is trained based on input data 202 including one or more input elements. During training and execution of the machine learning model 120, the machine learning model 120 transforms the input data 202 into a set of derived variables 204 (e.g., one or more derived variables). The machine learning model 120 then transforms the derived variables into a set of latent features 206 (e.g., one or more latent features). Consistent with implementations of the current subject matter, the one or more input elements 202, the one or more derived variables 204, the one or more latent features 206, and/or one or more reference statistics corresponding to the one or more input elements 202, the one or more derived variables 204, the one or more latent features 206 may be persisted to the model governance blockchain 135 as one or more reference assets 150, such as during training of the machine learning model 135. The one or more reference assets 150 may be accessed from the blockchain 135 by the execution engine 110 during execution of the trained machine learning model 120 to, for example, monitor performance of the machine learning model 120.

Based at least on the one or more latent features, the machine learning model 120 determines, at 208, one or more outputs 210. In some implementations, the output 210, and/or one or more reference statistics associated with the output 210, such as during training and/or development of the machine learning model 120, may be persisted to the model governance blockchain 135 for reference during production usage of the machine learning model 120. As described in more detail herein, derived statistical measures including the reference statistics, such as a mean, a standard deviation, a probability distribution, a threshold, and/or the like, establish a compliance baseline of the model operating parameters for compliance of use of the model in the production environment 210 (e.g., score). For each of the computed reference statistics, an optimal number of observations or time duration over which to collect observation data may be determined to compute the statistics. One or more thresholds using simulation studies and/or ethics studies may additionally and/or alternatively be determined (e.g., at the time of model training and/or model development) and persisted to the blockchain 135.

Figure 3:
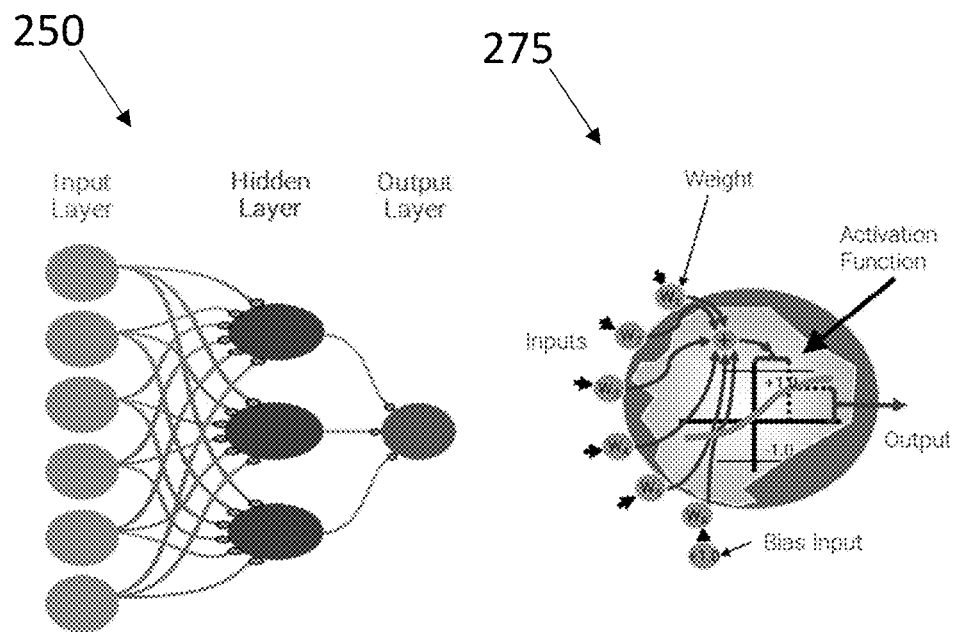
FIG. 3 depicts a schematic representation of a neural network, consistent with implementations of the current subject matter.

FIG. 3 illustrates another example of the machine learning model 120, consistent with implementations of the current subject matter. For example, FIG. 3 schematically depicts an example neural network model 250 (e.g., the machine learning model 120). As shown in FIG. 3, the example neural network model 250 has one input layer with six input variables, the hidden nodes in a single hidden layer, and one output node in the output layer. Thus, the neural network model 250 has one hidden layer with three latent features to be monitored. Statistical distributions of such latent features may be determined and persisted to the blockchain 135. FIG. 3 further schematically depicts an example of a latent feature 275 (e.g., the one or more latent features 206). In this example, the latent feature 275 is defined by a set of inputs that connect through weights to drive an activation function, F(x), such as tan h or sigmoid. Referring back to FIG. 2, the neural network model 250 includes an output layer with at least one output node which concatenates and/or sums (e.g., via a weighted sum) the values of the hidden nodes into one or more output scores (e.g., the output 210). Each hidden and output node represents a mathematical nonlinear transformation of all the data input to the hidden and output node. As the most active latent feature saturate, large changes in the input variables may not have a material change in latent feature activations. This is due to the robustness of F(x), such as tan h(F(x)), where large values of positive x move F(x) closer to 1, and large values of negative x move F(x) closer to −1. Accordingly, monitoring the one or more latent features of the machine learning model in production will ensure responsible and/or ethical use of the machine learning model 120.

Consistent with implementations of the current subject matter, to ensure accountability and model governance (e.g., continued model safety, unbiasedness, and representative nature) of the machine learning model 120 and adherence with responsible AI practices, the reference assets 150 determined during model development are persisted on the model governance blockchain 135. As noted, the reference assets 150 may include the one or more input data elements 202 used for training the machine learning model 120, one or more derived variables 204, one or more learned latent features 206, one or more reference statistics, results of ethics, stability, and robust tests, and specific tests done to determine thresholds (e.g., as part of one or more reference statistics) for the one or more input elements, derived features, and/or latent features under which the model is permissible for use.

Figure 4:
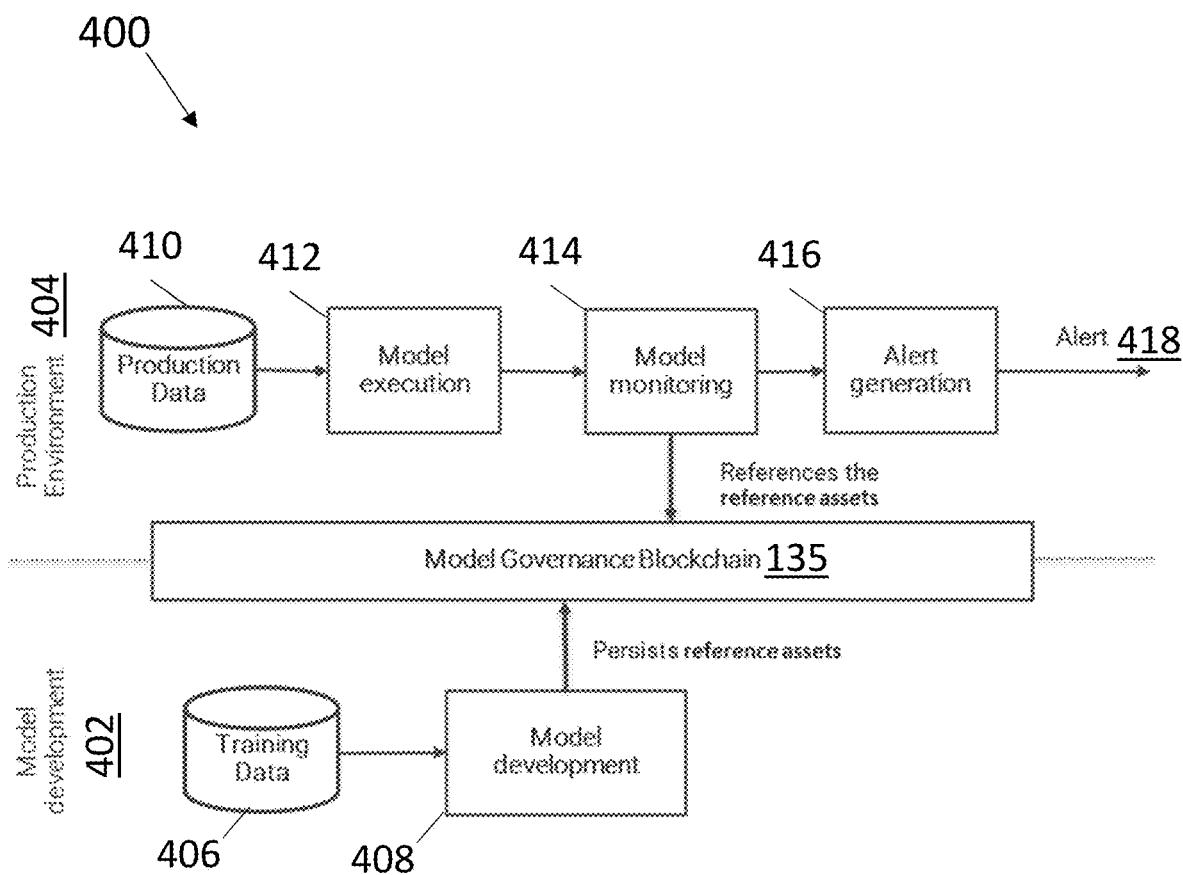
FIG. 4 depicts an example process for machine learning model governance, consistent with implementations of the current subject matter.

FIG. 4 illustrates an example process 400 for machine learning model governance, consistent with implementations of the current subject matter. As shown in FIG. 3, the one or more reference assets 150 may be determined and persisted to the blockchain 135 in a model development environment 402. Further, the one or more reference assets 150 may be accessed, such as part of monitoring of the machine learning model 120 in a production environment 404. The reference assets 150 persisted on the model governance blockchain 135 are referenced by monitoring in the production environment to determine whether to generate an alert based on one or more thresholds, such as thresholds associated with one or more monitored statistics of data elements, derived features, latent features, output scores, and/or the like, and/or to determine whether to intervene (e.g., perform a corrective operation).

Referring to FIG. 4, the machine learning model 120 may be developed at 408. For example, the machine learning model 120 may be determined and/or trained (e.g., by the execution engine 110) based on training data 406. The machine learning model 120 may be trained to determine an output, such as the output score 210. As part of model development, at 408, one or more reference assets 150 may be determined and/or persisted on the model governance blockchain 135. The one or more reference assets 150 may include one or more input elements 202 (e.g., at least some of the training data at 406), one or more derived variables 204 determined based at least on the one or more input elements 202, one or more latent features 206 determined based at least on the one or more derived variables 204, and one or more reference statistics determined based on the one or more input elements 202, the one or more derived variables 204, and/or the one or more latent features 206, such as a mean, a standard deviation, probability distribution, a coverage, a quantity and/or type of latent feature that is activated, and/or the like, and one or more thresholds.

Thus, to enable model monitoring, the one or more reference assets 150 including the one or more input elements 202, one or more latent features 206 determined based at least on the one or more derived variables 204, and one or more reference statistics associated with the one or more input elements 202, one or more latent features 206 determined based at least on the one or more derived variables 204 may be determined during model development at 408 to capture information to be persisted on the model governance blockchain 135 in an auditable and immutable manner. This information represents the statistical measures to be computed, thresholds and severity of alerts to be monitored for alert generation.

During the time of model development, such as at 408, an evaluation dataset is used to compute these statistical distributions for the inputs, features, latent features and functions of these quantities for enforcement of correct operating use of the model per responsible AI standards. The evaluation dataset is similar to and distinct from the training data 406, and may include one or more data records not used to train the model 120. For example, the input data 202 may include a first subset (e.g., a training dataset 406) is used to train the model 120, a second subset (e.g., the test dataset) used to train the model by testing for generalization of the model, a third dataset (e.g., an evaluation dataset) treated as the unseen dataset where all the model performance related monitoring statistics, thresholds, and severities are captured for relevant data inputs, derived features, latent features, and output score which set the expectation for the model's behavior in the production, and/or the like. The evaluation dataset defines the statistics for robustness, stability, and ethics testing done on the data reflecting how shifts statistics of input data, derived features, latent features can impact the scores defining alerts for use intervention as part of responsible AI.

The evaluation dataset may be used (e.g., by the execution engine 110) to compute the statistical distribution (e.g., reference statistics) of each of the one or more data elements, derived features, and/or latent features for monitoring. As noted, the reference statistics may capture a density distribution of the one or more input elements, derived variables, and/or latent features, such as mean and standard deviation, their frequency distribution, data coverage and other statistics, as described herein. Sensitivity analysis and simulation studies may further be conducted (e.g., by the execution engine 110) to analyze and determine the operational thresholds above or below which alerts are generated (e.g., by the execution engine 110 or model governance system), and/or with severity thresholds to be used in situational awareness in responsible AI monitoring. These monitoring statistics, thresholds and alert details collectively may be referred to herein as reference assets 150.

One or more formats can be used for codifying the reference assets 150 on the model governance blockchain 135. For example, the one or more reference assets 150 may be persisted to the blockchain 135 in JSON format to codify the information on the blockchain. While JSON format, which is a key value pair annotation technique for passing along data in flexible format, may be used, other formats may be contemplated to allow for the reference assets 150 to be read and parsed in the persisted format.

As noted, the one or more reference assets 150 may be determined during model development, at 308, and may include the one or more input elements 202, one or more latent features 206 determined based at least on the one or more derived variables 204, and one or more reference statistics associated with the one or more input elements 202, one or more latent features 206. The one or more input data elements 202 may represent at least a portion of the training data 306 used in training the machine learning model 120. This training data is also representative of the data that is available for use by the machine learning model 120 to generate the output scores or decisions (e.g., the output 210) in the production environment.

In some implementations, the reference statistics and/or attributes associated with the one or more input elements 202 may be determined. The one or more input elements 202 and/or the reference statistics associated with the one or more input elements 202 may be determined based at least on a mapping between the one or more input elements 202 and the one or more derived variables 204.

FIG. 5 illustrates an example mapping 500 between the one or more input elements 202 and the one or more derived variables 204, consistent with implementations of the current subject matter. The mapping 500 may be used to determine the one or more input elements that impact and/or are likely to impact one or more latent features 206, and as a result, the output 210 determined by the machine learning model 120. In some implementations, the one or more input elements 202 determined to not impact the one or more latent features 206 and/or the score 210 may be ignored and/or may not be persisted to the blockchain 135. For example, since the one or more input elements 202 determined to not impact the one or more latent features 206 and/or the score 210 would not drive the score determination, and as a result would not have an impact on the score determination, such one or more input elements 202 may not need to be monitored during model usage in the production environment 404.

Additionally and/or alternatively, one or more input elements 202 may be determined that can cause the model 120 to take a different segmentation path and consequently have a significant effect on the score 210. Such input elements 202 (if any) may be persisted to the blockchain 135. Thus, all input elements 202 impacting the one or more latent features 206 in the machine learning model 120 that drive the score 210 of the machine learning model 120 may be persisted to the blockchain 120 for later reference during model usage in production.

As an example, as shown in the mapping 500, the first column (on the left) includes the one or more input elements 202 and the second column (on the right) includes the one or more derived variables that are derived based on each input element from the first column. For example, in the mapping 500, the derived variables f2, f4 were determined to be derived based at least in part on input element #1, the derived variables f1, f2 were determined to be derived based at least in part on input element #3, the derived variable #4 was determined to be derived based at least in part on input element #4, and the input element #5 was determined to have an impact on the segmentation of the training data. Again referring to the mapping 500, the input element #2 was determined to not impact (or have a minimal impact) on the latent features and/or score. In this example, input elements #1, #3, #4, and #5 would be persisted to the blockchain 135, while the input element #2 may not be persisted in some implementations.

The one or more reference statistics can be determined based on the one or more input elements 202 that may impact (or may likely to impact). For example, the mean and other statistical distributions of each of the relevant input elements 202, such as entire probability distributions can be determined. As described herein, these statistics act as reference statistics to establish a baseline of performance. For each of the determined reference statistics, an optimal quantity of observations or time duration over which to collect observation data needed to compute the required statistics for monitoring, may be determined.

In some implementations, the determined reference statistics includes a threshold associated with the one or more input elements. The threshold may include one, two, three, four, or more thresholds. Each of the thresholds may correspond to a different severity level, which as described herein, may cause one or more corrective operations depending on the severity level. The threshold associated with the one or more input elements 202 may be an approximately 5% deviation, 10% deviation, 15% deviation, 20% deviation and/or the like, between one or more production statistics determined during production usage of the machine learning model 120 and the threshold of the reference statistics. In some implementations, the threshold is a 5% deviation, 10% deviation, 15% deviation, 20% deviation and/or the like in mean, a 5% deviation, 10% deviation, 15% deviation, 20% deviation and/or the like in variance, a 5% deviation, 10% deviation, 15% deviation, 20% deviation and/or the like in 95% percentile of a probability distribution, etc.

As noted, multiple thresholds at multiple levels at which deviations may be flagged can be determined. For example, a low, a medium and a high threshold for flagging can be determined. When the corresponding production statistic meets (e.g., is greater than or equal to) each threshold, a particular action may be performed by the execution engine 110. This makes it possible to create multiple scenarios for investigation of the model being used in production according to responsible AI standards given the severity of deviation.

FIG. 6 depicts a schematic representation 600 of reference assets 150, including the one or more input elements 202 and the associated reference statistics, consistent with implementations of the current subject matter. The schematic representation 600 represents a format in which the one or more input elements 202 and associated reference statistics are persisted to the blockchain 135. In this example, the reference statistics for input element #1 includes a mean of 2.7, a first alert threshold value of 2.8 across N=1000 samples (e.g., number of observations, N, required to compute a reliable measure of the statistics), and a standard deviation of 1.1, and a second alert threshold value of 1.3 across N=1000 samples. The reference statistics for input element #3 includes a mean of 6.9, a standard deviation of 2.3, a first alert threshold of divergence of 0.2, across N=10000 samples. Thus, for input element #1, an alert is generated when mean computed in the production environment 304, such as during production usage of the model 120, computed over 1000 sample points is greater than 2.8 or standard deviation computed over 1000 sample points is greater than 1.3. For input element #3, using 10,000 data points collected in the production environment 304 (e.g., during model usage in production), mean and standard deviation is computed and along with the provided reference mean and standard deviation, divergence needs is computed. If this divergence is greater than 0.2, then an alert is generated (e.g., at 316 in FIG. 3).

In some implementations, divergence is determined based at least on mean and standard deviation values, $\overline{Y}_{t_{production}}$ and $\sigma_{t_{production}}$, respectively calculated in the production environment 404. Reference values, $\overline{Y}_{t_{reference}}$ and $\sigma_{t_{reference}}$ are captured during development of machine learning model as part of the reference statistics persisted on the model governance blockchain 135. Divergence is computed using equation (1) below.

$$\frac{(\overline{Y}_{t\,production} - \overline{Y}_{reference})^2}{\frac{1}{2}(\sigma^2_{t^2_{production}} + \sigma^2_{reference})} \qquad \text{Equation (1)}$$

In some implementations, the execution engine 110 operates with a tolerance level within which it assumes that data drift is not significant enough to incorporate. The model governance system can be configured to detect divergence being larger than the tolerance.

Accordingly, the reference statistics associated with the one or more input elements 202 can be codified in the blockchain 135 to enable model monitoring in the production environment 304. In some implementations, a simulation study is used to assess the robustness of the machine learning model 120 during development. The simulation study provides a mechanism to conduct sensitivity analysis to establish relationship between the data element and the output score. While a determined deviation in statistics of the input data element #3 may cause a small change in the model performance, the same deviation for data element #1 may lead to a large change. Thus, sensitivity analysis can be used during model development to determine the one or more thresholds that are used for monitoring the model 120 in the production environment 404. For supporting use cases in which multiple severity alerts are implemented, multiple thresholds may be identified based on the degree of impact on the output score. As shown in FIG. 6, this information is then persisted as reference statistics associated with the one or more input elements (e.g., as reference assets 150) on the model governance blockchain 135.

The properties of the data used by the machine learning model 120 for generating an output (e.g., the score) may change, sometimes due to sudden change in the environment, but often over a period of time. Moreover, the change in data can also be deliberate in malicious attempt by a bad actor to confuse the machine learning model 120. Such changes in the data may be referred to herein as data drift. This drift, whether observable or not, can lead to change in the machine learning model's behavior making the model non-representative and leading to model performance drift or invalid scores. It should be understood that data drift can be continuous or targeted. In case of malicious data manipulation, data is manipulated by a criminal to cause the model to score differently as desired by the malicious actor. Thus, in each of these situations, drift may occur either in a stationary or non-stationary fashion. The monitoring thresholds described herein are examples of sample size, and acceptable tolerances to allow use of the model. In some other cases, the sample size may be defined in terms of time period of observation rather than quantity of samples.

In some implementations, the one or more input elements 202 may be used to derive one or more derived variables 204. The one or more derived variables 204 may be predictors that the model 120 may use in the determination of the output score 210. The derived variables are determined directly based on the one or more input elements 202 (e.g., raw data). For example, a derived variable may include a velocity of purchase dollars in 4 hours vs. 1 week as a ratio, or it could be balance due, credit limit, or the number of credit applications in the last one year, or a ratio of dollar spend 4 hours to 1 week. In some implementations, derived variables are based on domain expertise and defined based on the specific problem to be solved by the particular model 120 being developed. Where data may drift, such as if inflation causes all values of all input elements to be twice more expensive, the data will shift tremendously, but derived variables, such as purchase dollars in 4 hours vs. 1 week as a ratio would remain stable and valid despite shifts in data.

Figure 7:
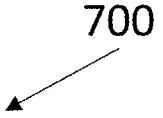
FIG. 7 depicts an example mapping between derived variables and latent features, consistent with implementations of the current subject matter.

FIG. 7 illustrates an example mapping 700 between the one or more derived variables 204 and the one or more latent features 206, consistent with implementations of the current subject matter. The mapping 700 may be used to determine the one or more derived variables 204 that impact and/or are likely to impact one or more latent features 206, and as a result, the output 210 determined by the machine learning model 120. In some implementations, the one or more derived variables 204 determined to not impact the one or more latent features 206 and/or the score 210 may be ignored and/or may not be persisted to the blockchain 135. For example, since the one or more derived variables 204 determined to not impact the one or more latent features 206 and/or the score 210 would not drive the score determination, and as a result would not have an impact on the score determination, such one or more derived variables 204 may not need to be monitored during model usage in the production environment 404.

Additionally and/or alternatively, one or more derived variables 204 may be determined that can cause the model 120 to take a different segmentation path and consequently have a significant effect on the score 210. Such derived variables 204 (if any) may be persisted to the blockchain 135. Thus, all derived variables 204 impacting the one or more latent features 206 in the machine learning model 120 that drive the score 210 of the machine learning model 120 may be persisted to the blockchain 120 for later reference during model usage in production.

As an example, as shown in the mapping 700, the first column (on the left) includes derived variables 204 and the second column (on the right) includes the one or more latent features impacted by each derived variable 204 from the first column. For example, in the mapping 700, the derived variable f1 was determined to impact at least latent features LF1 and LF2, the derived variable f2 was determined to impact at least latent feature LF1, and the derived variable f4 was determined to impact at least latent features LF2 and LF3. Again referring to the mapping 700, the derived variables f3 and f5 were determined to not impact (or have a minimal impact) on the latent features and/or score. In this example, derived variables f1, f2, and f4 would be persisted to the blockchain 135, while the derived variables f3 and f5 (and/or the underlying input elements) may not be persisted in some implementations.

In some implementations, even if an input element is used for computing one or more derived variables, none of those derived variables may be used in any of the latent features. Thus, the mappings 500, 700 provide a list of all the derived variables 204 and a further fine-tuned list of input elements 202 that could impact the machine learning model's output score.

The one or more reference statistics can be determined based on the one or more derived variables 204 that may impact the output score of the model 120. For example, the mean and other statistical distributions of each of the relevant derived variables 204, such as entire probability distributions can be determined. As described herein, these statistics act as reference statistics to establish a baseline of performance. For each of the determined reference statistics, an optimal quantity of observations or time duration over which to collect observation data needed to compute the required statistics for monitoring, may be determined.

In some implementations, the determined reference statistics includes a threshold associated with the one or more derived variables. The threshold may include one, two, three, four, or more thresholds. Each of the thresholds may correspond to a different severity level, which as described herein, may cause one or more corrective operations depending on the severity level. The threshold may be predefined and/or dynamically determined. The threshold associated with the one or more derived variables 204 may be an approximately 5% deviation, 10% deviation, 15% deviation, 20% deviation and/or the like, between one or more production statistics determined during production usage of the machine learning model 120 and the threshold of the reference statistics. In some implementations, the threshold is a 5% deviation, 10% deviation, 15% deviation, 20% deviation and/or the like in mean, a 5% deviation, 10% deviation, 15% deviation, 20% deviation and/or the like in variance, a 5% deviation, 10% deviation, 15% deviation, 20% deviation and/or the like in 95% percentile of a probability distribution, etc.

As noted, multiple thresholds at multiple levels at which deviations may be flagged can be determined. For example, a low, a medium and a high threshold for flagging can be determined. When the corresponding production statistic meets (e.g., is greater than or equal to) each threshold, a particular action may be performed by the execution engine 110. This makes it possible to create multiple scenarios for investigation of the model being used in production according to responsible AI standards given the severity of deviation.

These reference statistics and thresholds, including the alert information may then be persisted on the model governance blockchain 135 as part of the model development at 408 to be referenced by model monitoring 414 in the production environment 404. Without referring to the persisted reference assets during model usage in the production environment 404, it may not be possible to monitor the derived variables or understand what each variable represents. Accordingly, the system 100 provides visibility into the model development and assists in monitoring production usage of machine learning models.

In some implementations, the one or more latent features may be determined based on the one or more derived variables and/or the one or more input elements. Identifying learned nonlinear relationships as part of the model development process at 302 can assist with responsible AI, explainability, ethics and stability testing, and understanding what drives the model's output scores. For decision trees, the nonlinear relationship can include the learned splits and leaf nodes and their firing percentages. For neural networks models, the learned nonlinear relationships are the latent features, such as the one or more latent features 206 that are the learned combinations of derived variables that that drive the output score 210. The one or more latent features may include one, two, ten, one hundred, one thousand or more latent features.

As an example, a latent feature, LF1, may be determined based on two derived variables, x1 and x2, as shown in the equations below:

$$x_1 = \frac{\text{purchase dollars in last 4 hours}}{\text{purchase dollars in last 1 week}} \quad \text{Equation 2}$$

$$x_2 = \frac{\text{balance due}}{\text{credit limit}} \quad \text{Equation 3}$$

$$LF_1 = \sigma(w_0 + w_1 x_1 + w_2 x_2), \quad \text{Equation 4}$$

where, $$\sigma(x) = \frac{1}{1 + e^{-x}} \quad \text{Equation 5}$$

and $w_0$, $w_1$ and $w_2$ are the learned weights.

As described herein, machine learning models, such as neural networks have layered architecture which allows for explicit learning of the relationships between the derived variables, the input elements, and/or the like, leading to the outcome score. The latent features indicate how the derived variables and/or the input elements are combined to produce a latent feature. Thus, in some implementations, it is the observability and monitoring of latent features that determine the success or failure of the monitoring activity, due at least in part to the impact of the latent features on the output determined by the machine learning model 120. Thus during the model development at 408, the latent feature behavior independently and in combination with each other, and the impact on the model outcome score can be persisted to the model governance blockchain 135, as part of the reference assets 150. In some implementations, a sensitivity analysis and various simulations may be performed to analyze and understand the latent features, and extract relevant information needed to monitor their behavior, which can be persisted to the model governance blockchain 135 to ensure responsible use of the model 120 in operation.

The one or more reference statistics can be determined based on the one or more latent features 206 that may impact (or may likely to impact) the output score of the model 120. For example, the mean, standard deviation, probability distribution, activation of the latent features, frequency of activation of the latent features, combinations of latent features that activate alone or together, an/or the like, can be determined. The reference statistics associated with the one or more latent features 206 may be determined in terms of relative frequency, such as percent of cases over a certain number of cases or samples, or over a time period. For instance, the reference statistics associated with the one or more latent features 206 can include a frequency each of the latent features in the machine learning model 120 activates over a time period. Activation of a latent feature can indicate that its activation value is close to saturation. Additionally and/or alternative, the reference statistics associated with the one or more latent features 206 can include a frequency of a pair or group of latent features activate together over a certain number of cases or samples.

In some implementations, the determined reference statistics includes a threshold associated with the one or more latent features 206. The threshold may include one, two, three, four, or more thresholds. Each of the thresholds may correspond to a different severity level, which as described herein, may cause one or more corrective operations depending on the severity level. The threshold may be predefined and/or dynamically determined. The threshold associated with the one or more latent features 206 may be an approximately 5% deviation, 10% deviation, 15% deviation, 20% deviation and/or the like, between one or more production statistics determined during production usage of the machine learning model 120 and the threshold of the reference statistics. In some implementations, the threshold is a 5% deviation, 10% deviation, 15% deviation, 20% deviation and/or the like in mean, a 5% deviation, 10% deviation, 15% deviation, 20% deviation and/or the like in variance, a 5% deviation, 10% deviation, 15% deviation, 20% deviation and/or the like in 95% percentile of a probability distribution, etc.

As noted, multiple thresholds at multiple levels at which deviations may be flagged can be determined. For example, a low, a medium and a high threshold for flagging can be determined. When the corresponding production statistic meets (e.g., is greater than or equal to) each threshold, a particular action may be performed by the execution engine 110. This makes it possible to create multiple scenarios for investigation of the model being used in production according to responsible AI standards given the severity of deviation.

As an example, distribution analysis may indicate that latent feature LF1 from equation 4 should have 90% of values below 0.85, and it may be determined that if more than 92% of the values in a sample of 100,000 cases are below 0.85, then an alert should be generated. In other words, if 0.85 is the activation threshold (e.g., a defined saturation level), then latent feature LF1 is expected to activate 10% of the time. If latent feature LF1 activates or saturates only 8% of the time over 100,000 consecutive cases in the production, then an alert should be generated. These thresholds may be persisted in the blockchain 135.

Another example includes latent features activating together. In an example, there are 10 latent features, out of which latent features LF1, LF3 and LF7 have been determined to activate together 0.001% of the cases. If these latent features activate together more than 0.002% of the times or less than 0.0005% of the times over a single day, then an alert should be generated. Multiple latent features activating together can be referred to as a tuple, with the positional value indicating the corresponding latent feature activating (1) or not activating (0). In this example, the tuple (e.g., combination of latent features) would be represented as (1,0,1,0,0,0,1,0,0,0) being observed in 0.001% of the cases. This statistic may be persisted in the blockchain as part of the reference statistics associated with the one or more latent features.

The statistical distribution and alert generation information may be codified on the model governance blockchain 135. FIG. 8 depicts a schematic representation 800 of reference assets 150, including the one or more latent features and the associated reference statistics, consistent with implementations of the current subject matter. The schematic representation 800 represents a format in which the one or more latent features 206 and associated reference statistics are persisted to the blockchain 135. In this example, the reference statistics include an activation threshold of 0.85 (defined as saturation), indicating that latent feature LF1 activates (i.e., it is >0.85) 10% of the time over 100,000 samples. Further, this configuration persists the alert generation scenario as described. Further, the reference statistics associated with the latent features LF1, LF3 and LF7 activating together has been persisted along with alert generation scenarios. Each of the alerts can be classed into different levels of severity to be used in reviewing the monitoring alerts that are generated as part of the responsible AI usage of the model.

In some implementations, the reference statistics additionally and/or alternatively include coverage. Coverage includes the distribution of the input elements 202, derived variables 204, and/or latent features 206 in a multi-dimensional phase space. More specifically, for various sub-regions in the phase space, coverage indicates a quantity of data points that exist in each of the sub-regions for input elements 202, derived variables 204, and/or latent features 206.

A model, such as the machine learning model 120, may be representative in the phase spaces where there is enough data coverage. Operating the model when there is not sufficient coverage can lead to unexpected outcomes and irresponsible use of the model 120. In some implementations, the training dataset at 406 can be used to establish the reference for the data coverage. For each of the input elements 202, derived variables 204, and/or latent features 206 in the phase space, bins can be determined. This leads to creation of multiple n-dimensional hypercells including at least some data points. Then the proportional distribution of data points across each of the cells is captured, as well as the behavior expectation around each of those bins. For example, if there is a bin that does not include any data points in the training dataset, then, during production, no data points should be expected to exist in such bins. These bins and/or expectations may be persisted to the blockchain 135 for later reference. An alert (whose criterion is also be persisted in the blockchain 135) can be triggered if a single data point falls in such an empty bin during model execution. For populated bins, upper and lower thresholds can be used and persisted in the blockchain 135 to indicate deviation from the expected coverage during model usage in production. An alert can be generated when a proportion of data points over a specified sample size (persisted on the blockchain 135) breaches the persisted thresholds in such a bin during model execution.

FIG. 9 depicts a schematic representation 900 of reference assets 150, including the coverage, consistent with implementations of the current subject matter. The schematic representation 900 represents a format in which the coverage is persisted to the blockchain 135. In this example, the reference statistics include the coverage. In this truncated example, two hypercells, are included—one with data points and one without any data points. For the hypercell with 6% of the population concentrated in that cell, if the frequency distribution falls below 4% or above 8% over a sample size of 1000 instances, then an alert will be raised. These thresholds may be persisted in the blockchain 135. For the empty hypercell, if a single data point is observed to fall in this cell during production usage, an alert will be generated. This threshold may also be persisted in the blockchain 135 for later reference.

Referring back to FIG. 4, in the production environment 404, production data, at 410, is provided to the machine learning model 120. At 412, the machine learning model 120 receives the production data and is executed. For example, the machine learning model 120 may determine a score or other output based on the production data. The machine learning model 120 may be trained during the model development 408.

At 414, the machine learning model 120 may be monitored (e.g., by the execution engine 110). This ensures responsible AI and adherence to responsible AI standards. In some implementations, the execution engine 110 determines, such as during production usage of the model 120 at 412, one or more production statistics. The one or more production statistics may correspond to the one or more reference statistics described herein. However, rather than being determined during model development (like the reference statistics), the production statistics may be determined during model usage in production, such as at 412. The production statistics may correspond to the one or more input elements, derived variables, and/or latent features of the model during production usage. The production statistics may correspond to any one or more of the reference statistics described herein.

The execution engine 110, such as during the monitoring at 414, may access the blockchain 135 to reference the one or more reference assets 150, such as the one or more input elements 202, one or more derived variables 204, one or more latent features 206, and/or the one or more reference statistics associated with the one or more input elements 202, one or more derived variables 204, one or more latent features 206, including the persisted thresholds, and/or the like specifying the conditions for alert generation. Based on the accessed reference assets 150, the execution engine 110 may compare the one or more corresponding statistics computed in the production environment on one or more of the input data elements, derived variables or latent features, or functions of these and, to the thresholds included in the one or more reference statistics.

Consistent with implementations of the current subject matter, at 416, the execution engine 110 may trigger an alert 418 (e.g., a text, an audio, visual, audio visual, and/or the like) based on the production statistics meeting (e.g., being greater than or equal to) the thresholds. As noted, various alerts may be triggered based on a severity level as indicated by the production statistics meeting one or more threshold levels.

In some implementations, based on the alert 418 and/or the production statistics meeting one or more thresholds, the execution engine 110 may perform one or more corrective actions. The one or more corrective operations includes: generating the score based on a second machine learning model different from the trained machine learning model, ignoring the score generated by the trained machine learning model, generating the score based on one or more score generation techniques, and/or leveraging the score selectively in alternate strategies and decisioning logic, among other corrective actions.

In some implementations, the one or more corrective operations are generated based on the severity level indicated by the alert. For example, as noted, the severity level may be determined based on a magnitude of the deviation between the one or more production statistics associated with the one or more latent features and the one or more reference statistics associated with the one or more latent features. A first corrective operation may be performed based on the deviation meeting (e.g., is greater than or equal to) a first threshold indicating a first severity, a second corrective operation may be performed based on the deviation meeting (e.g., is greater than or equal to) a second threshold indicating a second severity, a third corrective operation may be performed based on the deviation meeting (e.g., is greater than or equal to) a third threshold indicating a third severity, and so on. Accordingly, the model governance system 100 described herein provides for blockchain-based model governance and auditable monitoring of machine learning models.

FIG. 10 depicts a flowchart illustrating a process 1000 for blockchain-based model governance and auditable monitoring of machine learning models, such as the machine learning model 120. Referring to FIGS. 1-9, one or more aspects of the process 1000 may be performed by the model governance system 100, the execution engine 110, other components therein, and/or the like.

At 1002, a machine learning model, such as the machine learning model 120 (e.g., a trained machine learning model), may determine a score. The trained machine learning model may determine the score based at least on one or more latent features. Additionally and/or alternatively, the trained machine learning model may determine the score based at least on one or more input elements and/or derived variables. The one or more derived variables may be computed directly based on the one or more input elements.

In some implementations, the trained machine learning model may be trained and/or otherwise developed. During training and/or development of the machine learning model, the one or more latent features, one or more input elements, and/or one or more derived variables may be determined. In some implementations, one or more reference statistics corresponding to the one or more latent features, the one or more input elements, and/or the one or more derived variables may further be determined. The one or more latent features, one or more input elements, one or more derived variables, and/or the one or more reference statistics corresponding to the one or more latent features, one or more input elements, and/or one or more derived variables may be persisted to the model governance blockchain (e.g., the model governance blockchain 135), such as during the training and/or development of the model (e.g., the machine learning model 120).

At 1004, determination of the score by the machine learning model is monitored (e.g., via the execution engine 110). For example, the execution engine 110 may determine one or more production statistics associated with the one or more latent features. Additionally and/or alternatively, the execution engine 110 may determine one or more production statistics associated with the input data (e.g., input elements) and/or the one or more derived variables. The one or more production statistics may include at least one of a production mean, a production standard deviation, and a production frequency of activation of the one or more latent features.

In some implementations, a production coverage may be determined, such as via the execution engine 110. The production coverage may indicate a distribution of the one or more latent features, the one or more derived variables, and/or the one or more input elements based on determining the score. The one or more production statistics may additionally and/or alternatively include the production coverage.

In some implementations, the execution engine 110 may access one or more reference assets persisted on a model governance blockchain, such as the model governance blockchain 135. The one or more reference assets were persisted during training of the trained machine learning model. The one or more reference assets may also be determined during training of the trained machine learning model.

The one or more reference assets include one or more reference statistics associated with the one or more latent features and a threshold indicating a deviation between the one or more production statistics and the one or more reference statistics. The one or more reference statistics may include at least one of a reference mean, a reference standard deviation, and a reference frequency of activation of the one or more latent features during training of the trained machine learning model. The one or more reference statistics may additionally and/or alternatively include at least one of a reference mean, a reference standard deviation, and probability distribution, and/or the like of the one or more derived variables that are determined during training of the trained machine learning model, and may be persisted to the model governance blockchain. The one or more reference statistics may additionally and/or alternatively include at least one of a reference mean, a reference standard deviation, and probability distribution, and/or the like of the one or more input elements that are determined during training of the trained machine learning model, and may be persisted to the model governance blockchain. In some implementations, the one or more reference assets persisted on the model governance blockchain includes a second threshold (e.g., a derived variable threshold) indicating a deviation from one or more reference statistics associated with the one or more derived variables. In some implementations, the one or more reference assets persisted on the model governance blockchain includes a third threshold (e.g., an input element threshold) indicating a deviation from one or more reference statistics associated with the one or more input elements.

In some implementations, the one or more production statistics associated with the one or more latent features are compared (e.g., via the execution engine 110) to the one or more reference statistics associated with the one or more latent features to determine a magnitude of deviation between the one or more production statistics computed in production associated with the one or more latent features and the one or more reference statistics associated with the one or more latent features. Additionally and/or alternatively, the one or more production statistics associated with the one or more input elements are compared (e.g., via the execution engine 110) to the one or more reference statistics associated with the one or more input elements to determine a magnitude of deviation (e.g., a tolerance of the deviation) between the one or more production statistics associated with the one or more input elements and the one or more reference statistics associated with the one or more input elements. Additionally and/or alternatively, the one or more production statistics associated with the one or more derived variables are compared (e.g., via the execution engine 110) to the one or more reference statistics associated with the one or more derived variables to determine a magnitude of deviation between the one or more production statistics associated with the one or more derived variables and the one or more reference statistics associated with the one or more derived variables. Additionally and/or alternatively, the production coverage of the one or more production statistics may be compared to the reference coverage of the reference assets persisted on the model governance blockchain.

At 1006, an alert may be generated (e.g., via the execution engine 110) based on the one or more production statistics associated with the one or more latent features breaching (e.g., is greater than or equal to) the threshold. In some implementations, the alert is further generated based on one or more production statistics associated with the one or more derived variables meeting (e.g., is greater than or equal to)

the second threshold. Additionally and/or alternatively, the alert is further generated based on one or more production statistics associated with the one or more input elements meeting (e.g., is greater than or equal to) the third threshold. Additionally and/or alternatively, the alert is further generated based on the production coverage meeting the threshold corresponding to the reference coverage.

In some implementations, the execution engine 110 performs one or more corrective operations based on the alert. The one or more corrective operations includes: generating the score based on a second machine learning model different from the trained machine learning model, ignoring the score generated by the trained machine learning model, generating the score based on one or more score generation techniques, and/or leveraging the score selectively in alternate strategies and decisioning logic, among other corrective actions.

In some implementations, the one or more corrective operations are generated based on a severity level indicated by the alert. The severity level may be determined based on a magnitude of the deviation between the one or more production statistics associated with the one or more latent features, the one or more derived variables, and/or the one or more input elements, and the one or more reference statistics associated with the one or more latent features, the one or more derived variables, and/or the one or more input elements. For example, a first corrective operation may be performed based on the deviation meeting (e.g., is greater than or equal to) a first threshold indicating a first severity, a second corrective operation may be performed based on the deviation meeting (e.g., is greater than or equal to) a second threshold indicating a second severity, a third corrective operation may be performed based on the deviation meeting (e.g., is greater than or equal to) a third threshold indicating a third severity, and so on.

Figure 11A:
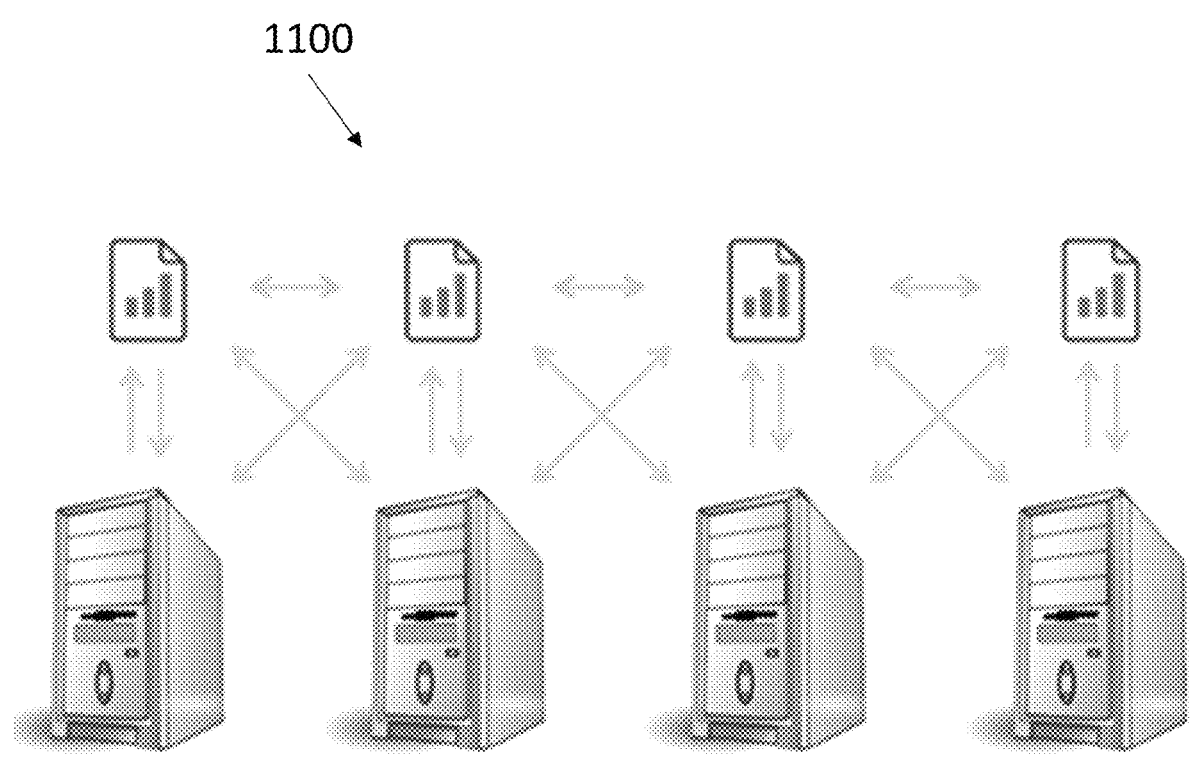
FIG. 11A depicts a schematic representation of a distributed ledger replicated and implemented on multiple nodes, which are synchronized using a peer-to-peer network, consistent with implementations of the current subject matter.

FIG. 11A is a schematic representation 1100 of the model governance blockchain 135, consistent with implementations of the current subject matter. The model governance blockchain 135 may be a distributed ledger replicated and implemented on multiple nodes which are synchronized using a peer-to-peer network. One form of distributed ledger design is a blockchain system, such as the model governance blockchain 135, which employs a chain of blocks to provide security of the information. Blocks are a continuously growing list of records, which are linked using cryptography or similar methods. Each block typically contains a cryptographic hash of the previous block to provide security, along with a timestamp and the transaction data. This linkage ensures that each transaction is recorded in manner that creates an audit trail. Once recorded, the data in any given block cannot be altered without invalidating the cryptographic hash of all the subsequent blocks. This makes a blockchain resistant to tampering of the recorded transaction data (e.g., the reference assets described herein), as all copies would need to be manipulated.

Functionalities of the underlying blockchain infrastructure are leveraged to expose the participants, assets, transactions and queries to an external application. For instance, in one implementation, using a Hyperledger fabric, the model governance blockchain 135 is exposed as a REST API using the Loopback framework. An Angular JS application allows access to the REST API using a graphical user interface. A REST API may also connect to a wallet for identity management and multi-user access. It is configured to use an open source library such as Passport to authenticate itself with the REST API. A web browser is used as at least part of the client device 135 for accessing the application.

Figure 11B:
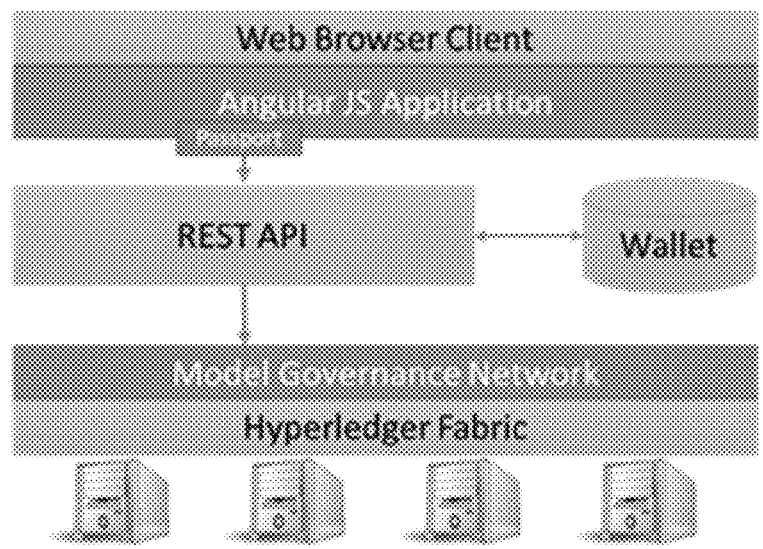
FIG. 11B is a high level architectural diagram of an implementation of a model governance blockchain system, consistent with implementations of the current subject matter.

FIG. 11B shows a high level architectural diagram 1110 of the overall implementation of the model governance blockchain application on Hyperledger Fabric. It also shows the relationship of a passport and a wallet with the rest of the application. Those of skill in the art would recognize that other blockchain infrastructures and support applications could also be used.

Further, a graphical user interface, such as via the client device 130, of the application that sits on top of the model governance blockchain 135 provides access to the reference assets. For a particular reference asset, the application provides access to all the corresponding requirements, sprints, models, variables and execution codes. Invocation of various transactions are made easy and intuitive using this interface. For instance, in one implementation, moving a requirement from one sprint to the next sprint of a reference asset is achieved directly by "move requirement" or by successively invoking the "remove requirement" and "add requirement" with a correct set of references for the "from" and "to" sprints. Similarly, to add an existing variable to a model, a list of candidate variables, which are either "CERTIFIED" or "DEPLOYED," is displayed to select from. The LogEntries are shown as a way to scroll through the history of a selected asset that is displayed. Queries provide the necessary information to present relevant additional information to the user.

Figure 11C:
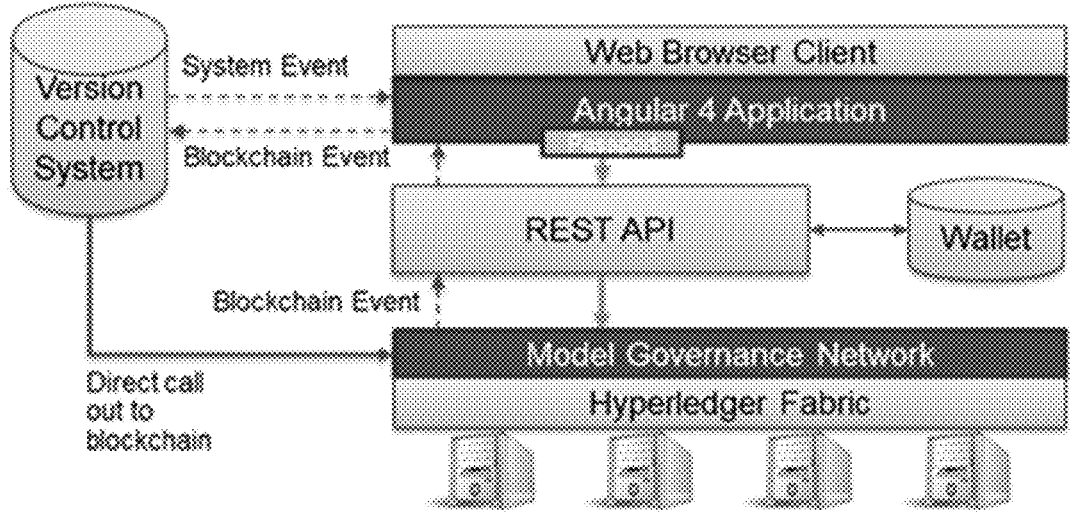
FIG. 11C is a block diagram schematic of a model governance system, consistent with implementations of the current subject matter.

The blockchain 135 is designed to work on the concept of events and direct callouts to integrate with existing systems. The blockchain 135 emits certain types of events when certain transactions are executed, as described herein. Similarly, the system "listens" for any event generated by external systems. External systems can also make a direct call to the blockchain 135, though the event approach is always a recommended approach from modularity and design principle perspective. For example, when the code in the version control system is updated, it sends out a system event notification that is captured by the present solution. The system in turn invokes a transaction call in the blockchain governance to invoke an update transaction, which updates the status as well as the version control location reference, e.g., GITURL. This transaction further emits an update event, and this event is processed by our solution to send a notification to the project owner of the change. If the project owner chooses to decline approval of this change, the corresponding transaction emits an event that is processed to revert the version in the version control system. FIG. 11C shows the schematic 1120 of the mechanisms by which the system 100 integrates with external systems like version control systems.

Figure 12:
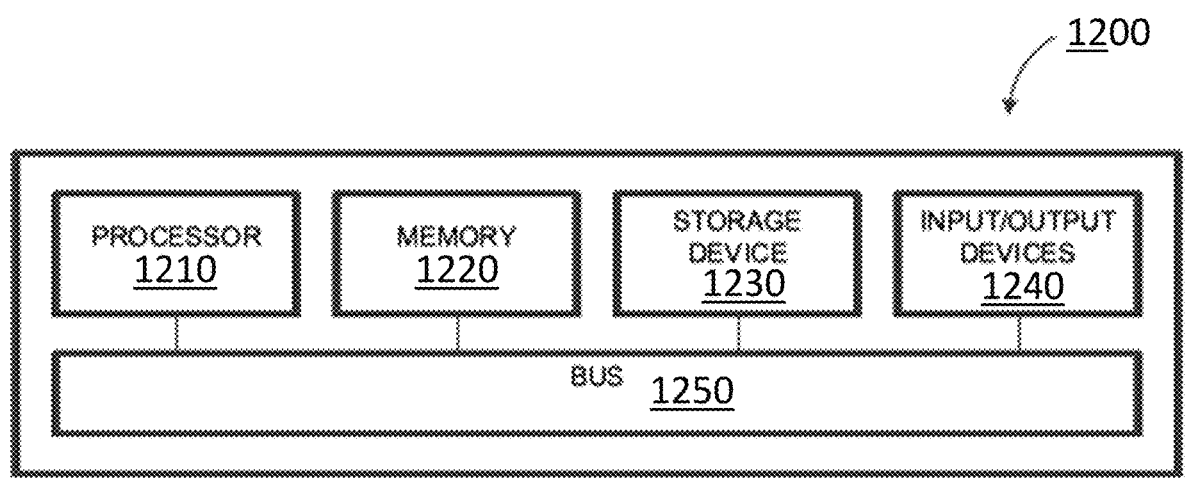
FIG. 12 depicts a block diagram illustrating an example of a computing system, consistent with implementations of the current subject matter.

FIG. 12 depicts a block diagram illustrating a computing system 1200 consistent with implementations of the current subject matter. Referring to FIGS. 1-12, the computing system 1200 can be used to implement the model governance system 100, the execution engine 110, the machine learning model 120, the model governance blockchain 135, and/or any components therein.

As shown in FIG. 12, the computing system 1200 can include a processor 1210, a memory 1220, a storage device 1230, and input/output devices 1240. The processor 1210, the memory 1220, the storage device 1230, and the input/output devices 1240 can be interconnected via a system bus 1250. The computing system 1200 may additionally or alternatively include a graphic processing unit (GPU), such as for image processing, and/or an associated memory for the GPU. The GPU and/or the associated memory for the GPU may be interconnected via the system bus 1250 with the processor 1210, the memory 1220, the storage device 1230, and the input/output devices 1240. The memory associated with the GPU may store one or more images described herein, and the GPU may process one or more of the images described herein. The GPU may be coupled to and/or form a part of the processor 1210. The processor 1210 is capable of processing instructions for execution within the computing system 1200. Such executed instructions can implement one or more components of, for example, the model governance system 100, the execution engine 110, the machine learning model 120, the model governance blockchain 135, and/or the like. In some implementations of the current subject matter, the processor 1210 can be a single-threaded processor. Alternately, the processor 1210 can be a multi-threaded processor. The processor 1210 is capable of processing instructions stored in the memory 1220 and/or on the storage device 1230 to display graphical information for a user interface provided via the input/output device 1240.

The memory 1220 is a computer readable medium such as volatile or non-volatile that stores information within the computing system 1200. The memory 1220 can store data structures representing configuration object databases, for example. The storage device 1230 is capable of providing persistent storage for the computing system 1200. The storage device 1230 can be a floppy disk device, a hard disk device, an optical disk device, or a tape device, or other suitable persistent storage means. The input/output device 1240 provides input/output operations for the computing system 1200. In some implementations of the current subject matter, the input/output device 1240 includes a keyboard and/or pointing device. In various implementations, the input/output device 1240 includes a display unit for displaying graphical user interfaces.

According to some implementations of the current subject matter, the input/output device 1240 can provide input/output operations for a network device. For example, the input/output device 1240 can include Ethernet ports or other networking ports to communicate with one or more wired and/or wireless networks (e.g., a local area network (LAN), a wide area network (WAN), the Internet).

In some implementations of the current subject matter, the computing system 1200 can be used to execute various interactive computer software applications that can be used for organization, analysis and/or storage of data in various (e.g., tabular) format (e.g., Microsoft Excel®, and/or any other type of software). Alternatively, the computing system 1200 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1240. The user interface can be generated and presented to a user by the computing system 1200 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
   determining, by a trained machine learning model, a score, wherein the trained machine learning model determines the score based at least on a plurality of latent features;
   monitoring the determining of the score by the trained machine learning model, wherein the monitoring includes:
      computing production statistics, each production statistic individually associated with one of the latent features; and
      accessing a plurality of reference assets persisted on a model governance blockchain, wherein the reference assets were persisted during training of the trained machine learning model, and wherein the reference assets include: a plurality of reference statistics each associated with an individual one of the latent features; and a threshold indicating a permissible deviation between the production statistics and the reference statistics; and
   generating an alert based on a deviation between the production statistics associated with the latent features and the reference statistics associated with the latent features excesses the threshold.

2. The method of claim 1, wherein the production statistics includes at least one of a production mean, a production standard deviation, a production frequency of activation, and a probability distribution of the latent features, and wherein the reference statistics includes at least one of a reference mean, a reference standard deviation, a reference frequency of activation, and a probability distribution of the latent features during training of the trained machine learning model.

3. The method of claim 1, wherein the trained machine learning model further determines the score based on a plurality of derived variables, the derived variables computed directly based on a plurality of input elements, wherein the reference assets persisted on the model governance blockchain includes a derived feature threshold indicating a tolerance for deviation from reference statistics associated with the derived variables, and wherein the alert is further generated based on production statistics associated with the derived variables meeting the derived feature threshold.

4. The method of claim 3, wherein the trained machine learning model further determines the score based on the input elements, wherein the reference assets persisted on the model governance blockchain includes a data element threshold indicating a tolerance for deviation from reference statistics associated with the input elements, and wherein the alert is further generated based on production statistics associated with the input elements meeting the data element threshold.

5. The method of claim 1, further comprising: performing one or more corrective operations based on the alert, wherein the one or more corrective operations includes: generating the score based on a second machine learning model different from the trained machine learning model, ignoring the score generated by the trained machine learning model, and/or leveraging the score selectively in alternate strategies and decisioning logic.

6. The method of claim 5, wherein the one or more corrective operations are generated based on a severity level indicated by the alert, and wherein the severity level is determined based on a magnitude of the deviation between the production statistics associated with the latent features and the reference statistics associated with the latent features.

7. The method of claim 1, further comprising: comparing the production statistics associated with the latent features to the reference statistics associated with the latent features to determine a magnitude of deviation between the production statistics associated with the latent features including tuple firing and the reference statistics associated with the latent features including tuple firing, wherein the reference assets persisted on the model governance blockchain includes a second threshold indicating a tolerance for the magnitude of deviation from reference statistics associated with the latent features, and wherein the alert is further generated based on production statistics associated with the latent features meeting the second threshold.

8. The method of claim 4, wherein the reference assets further includes:
   a reference coverage persisted on the model governance blockchain determined during training of the trained machine learning model, the reference coverage representing a distribution of the latent features, the derived variables, and/or the input elements during the training of the trained machine learning model; and
   a threshold corresponding to the reference coverage.

9. The method of claim 8, wherein the monitoring further includes:
   determining a production coverage indicating a distribution of the latent features, the derived variables, and/or the input elements based on determining the score;
   comparing the production coverage to the reference coverage persisted on the model governance blockchain; and
   generating the alert based on the production coverage meeting the threshold corresponding to the reference coverage.

10. The method of claim 1, further comprising:
    determining the latent features and the reference assets during training of the trained machine learning model; and
    persisting the latent features and the reference assets on the model governance blockchain.

11. A system comprising:
    at least one data processor; and
    at least one memory storing instructions, which when executed by the at least one data processor result in operations comprising:
       determining, by a trained machine learning model, a score, wherein the trained machine learning model determines the score based at least on a plurality of latent features;
       monitoring the determining of the score by the trained machine learning model, wherein the monitoring includes:
          computing production statistics, each production statistic individually associated with one of the latent features; and
          accessing a plurality of reference assets persisted on a model governance blockchain, wherein the plurality of reference assets were persisted during training of the trained machine learning model, and wherein the reference assets include: a plurality of reference statistics each associated with an individual one of the latent features; and a threshold indicating a permissible deviation between the production statistics and the reference statistics; and generating an alert based on a deviation between the production statistics associated with the latent features and the reference statistics associated with the latent features excesses the threshold.

12. The system of claim 11, wherein the production statistics includes at least one of a production mean, a production standard deviation, a production frequency of activation, and a probability distribution of the latent features, and wherein the reference statistics includes at least one of a reference mean, a reference standard deviation, a reference frequency of activation, and a probability distribution of the latent features during training of the trained machine learning model.

13. The system of claim 11, wherein the trained machine learning model further determines the score based on a plurality of derived variables, the derived variables computed directly based on ene a plurality of input elements, wherein the reference assets persisted on the model governance blockchain includes a derived feature threshold indicating a tolerance for deviation from reference statistics associated with the derived variables, and wherein the alert is further generated based on production statistics associated with the derived variables meeting the derived feature threshold.

14. The system of claim 13, wherein the trained machine learning model further determines the score based on the input elements, wherein the reference assets persisted on the model governance blockchain includes a data element threshold indicating a tolerance for deviation from reference statistics associated with the input elements, and wherein the alert is further generated based on production statistics associated with the input elements meeting the data element threshold.

15. The system of claim 11, wherein the operations further comprise: performing one or more corrective operations based on the alert, wherein the one or more corrective operations includes: generating the score based on a second machine learning model different from the trained machine learning model, ignoring the score generated by the trained machine learning model, and/or leveraging the score selectively in alternate strategies and decisioning logic.

16. The system of claim 15, wherein the one or more corrective operations are generated based on a severity level indicated by the alert, and wherein the severity level is determined based on a magnitude of the deviation between the production statistics associated with the latent features and the reference statistics associated with the latent features.

17. The system of claim 11, wherein the operations further comprise: comparing the production statistics associated with the latent features to the reference statistics associated with the latent features to determine a magnitude of deviation between the production statistics associated with the latent features including tuple firing and the reference statistics associated with the latent features including tuple firing, wherein the reference assets persisted on the model governance blockchain includes a second threshold indicating a tolerance for the magnitude of deviation from reference statistics associated with the latent features, and wherein the alert is further generated based on production statistics associated with the latent features meeting the second threshold.

18. The system of claim 14, wherein the reference assets further includes:

a reference coverage persisted on the model governance blockchain determined during training of the trained machine learning model, the reference coverage representing a distribution of the latent features, the derived variables, and/or the input elements during the training of the trained machine learning model; and a threshold corresponding to the reference coverage.

19. A non-transitory computer-readable medium storing instructions, which when executed by at least one data processor, result in operations comprising:

determining, by a trained machine learning model, a score, wherein the trained machine learning model determines the score based at least on a plurality of latent features;

monitoring the determining of the score by the trained machine learning model, wherein the monitoring includes:

computing production statistics, each production statistic individually associated with one of the latent features; and accessing a plurality of reference assets persisted on a model governance blockchain, wherein the reference assets were persisted during training of the trained machine learning model, and wherein the reference assets include: a plurality of reference statistics each associated with an individual one of the latent features; and a threshold indicating a permissible deviation between the production statistics and the reference statistics; and generating an alert based on a deviation between the production statistics associated with the latent features and the reference statistics associated with the latent features excesses the threshold.

20. The non-transitory computer-readable medium of claim 19, wherein the production statistics includes at least one of a production mean, a production standard deviation, a production frequency of activation, and a probability distribution of the latent features, and wherein the reference statistics includes at least one of a reference mean, a reference standard deviation, a reference frequency of activation, and a probability distribution of the latent features during training of the trained machine learning model.

* * * * *